United States Patent
Pilkington et al.

(10) Patent No.: US 10,884,764 B1
(45) Date of Patent: Jan. 5, 2021

(54) OPTIMIZING MANAGED RUNTIME APPLICATIONS FOR SERVERLESS ENVIRONMENTS

(71) Applicant: International Business Machines Corporation, Armonk, NY (US)

(72) Inventors: Adam John Pilkington, Eastleigh (GB); Graham C. Charters, Hampshire (GB); Timothy J. Mitchell, Chandlers Ford (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/515,547

(22) Filed: Jul. 18, 2019

(51) Int. Cl.
*G06F 9/445* (2018.01)
*G06F 9/455* (2018.01)
*G06F 8/41* (2018.01)

(52) U.S. Cl.
CPC ...... *G06F 9/44521* (2013.01); *G06F 9/45508* (2013.01); *G06F 9/45516* (2013.01); *G06F 8/443* (2013.01)

(58) Field of Classification Search
USPC .......................................................... 717/148
See application file for complete search history.

(56) References Cited

U.S. PATENT DOCUMENTS

| | | | |
|---|---|---|---|
| 6,163,780 A * | 12/2000 | Ross | G06F 8/4434 |
| 6,634,022 B1 | 10/2003 | Leermakers | |
| 6,856,994 B2 * | 2/2005 | Dickey | G06F 8/4434 |
| 8,042,103 B2 * | 10/2011 | Burka | G06F 9/445 717/166 |
| 8,132,162 B2 * | 3/2012 | Peterson | G06F 9/449 717/156 |
| 8,612,930 B2 | 12/2013 | Quinn | |
| 8,615,744 B2 * | 12/2013 | Ben-Artzi | G06F 8/76 717/137 |

(Continued)

OTHER PUBLICATIONS

R. Griffith and G. Kaiser; "A Runtime Adaptation Framework for Native C and Bytecode Applications"; 2006 IEEE International Conference on Autonomic Computing (pp. 93-104) (Year: 2006).*

(Continued)

*Primary Examiner* — Qing Chen
*Assistant Examiner* — Clint Thatcher
(74) *Attorney, Agent, or Firm* — Stephanie L. Carusillo

(57) ABSTRACT

A method, computer system, and computer program product for generating an optimized managed runtime application is provided. Method invocation statistics for a managed runtime application are received. The managed runtime application comprises code defining a plurality of classes, each class including bytecode for one or more methods associated with the class. The method invocation statistics identify the methods invoked during at least one previous execution of the managed runtime application. An optimized version of the managed runtime application is generated based on the method invocation statistics. The managed runtime application is retrieved, and bytecode for at least one method of a class of the managed runtime application is selectively replaced with proxy code based on the method invocation statistics. The proxy code is configured for retrieving the replaced code.

20 Claims, 7 Drawing Sheets

(56) References Cited

U.S. PATENT DOCUMENTS

| | | | | |
|---|---|---|---|---|
| 8,843,912 | B2* | 9/2014 | Brauneis | G06F 8/4434 |
| | | | | 717/158 |
| 9,164,740 | B2* | 10/2015 | Hargett, Jr. | G06F 9/44536 |
| 9,703,551 | B2* | 7/2017 | Thorat | G06F 11/302 |
| 9,721,092 | B2 | 8/2017 | Foley | |
| 2005/0223018 | A1* | 10/2005 | Forin | G06F 9/4413 |
| 2007/0201654 | A1* | 8/2007 | Shenfield | G06F 9/465 |
| | | | | 379/201.01 |
| 2015/0113545 | A1 | 4/2015 | Holt | |

OTHER PUBLICATIONS

Tilevich et al.; "Appletizing: Running Legacy Java Code Remotely from a Web Browser"; 21st IEEE International Conference on Software Maintenance (ICSM'05) (pp. 91-100); 2005 (Year: 2005).*

G. Gousios and D. Spinellis; "Java Performance Evaluation Using External Instrumentation," 2008 Panhellenic Conference on Informatics (pp. 173-177) (Year: 2008).*

Van Heiningen et al.; "Exploiting Dynamic Proxies in Middleware for Distributed, Parallel, and Mobile Java Applications"; Proceedings 20th IEEE International Parallel & Distributed Processing Symposium; 2006 (Year: 2006).*

Dennis Sosnoski; "Replacing Reflection with Code Generation"; IBM.com website [full url in ref.]; Jun. 10, 2004 (Year: 2004).*

Akkus et al., "Sand: Towards High-Performance Serverless Computing", 2018 USENIX Annual Technical Conference (USENIX ATC '18). Jul. 11-13, 2018 • Boston, MA, USA ISBN 978-1-931971-44-7, <https://www.usenix.org/system/files/conference/atc18/atc18-akkus.pdf>, 14 pages.

Mell et al., "The NIST Definition of Cloud Computing", National Institute of Standards and Technology, U.S Department of Commerce, Special Publication 800-145, Sep. 2011, 7 pages.

Siegl, Stephan, "inspectIT", eclipse, Copyright © Eclipse Foundation, Inc, <https://projects.eclipse.org/proposals/inspectit>, retrieved Jul. 10, 2019, 3 pages.

* cited by examiner

OPTIMIZING MANAGED RUNTIME APPLICATIONS FOR SERVERLESS ENVIRONMENTS

BACKGROUND

The present disclosure relates to executing managed runtime applications in a serverless environment, and, more specifically, to optimizing managed runtime applications for a serverless environment to provide improved performance.

SUMMARY

According to an aspect of the present disclosure, a computer implemented method is provided. The method comprises receiving method invocation statistics for a managed runtime application. The managed runtime application comprises code defining a plurality of classes, each class including bytecode for one or more methods associated with the class. The method invocation statistics identify the methods invoked during at least one previous execution of the managed runtime application. The method further comprises generating an optimized version of the managed runtime application based on the method invocation statistics. Generating the optimized application comprises retrieving the managed runtime application, and, based on the method invocation statistics, selectively replacing bytecode for at least one method of a class of the managed runtime application with proxy code. The proxy code is configured for retrieving the replaced code.

According to another aspect of the present disclosure, a system is provided. The system comprises memory and one or more processors. The one or more processors are configured to receive method invocation statistics for a managed runtime application. The managed runtime application comprises code defining a plurality of classes, each class including corresponding bytecode for one or more methods associated with the class. The method invocation statistics identify the methods invoked during at least one previous execution of the managed runtime application. The one or more processors are further configured to generate an optimized version of the managed runtime application based on the method invocation statistics. The one or more processors are configured to generate the optimized application by: retrieving the managed runtime application, and selectively replacing bytecode for at least one method of a class of the managed runtime application with proxy code based on the method invocation statistics. The proxy code is configured for retrieving the replaced bytecode.

According to another aspect of the present disclosure, a computer program product is provided. The computer program product comprises a computer readable storage medium having program instructions embodied therewith. The program instructions are executable by a processor to cause the processor to receive method invocation statistics for a managed runtime application. The managed runtime application comprises code defining a plurality of classes, each class including corresponding bytecode for one or more methods associated with the class. The method invocation statistics identify the methods invoked during at least one previous execution of the managed runtime application. The program instructions are executable by a processor to cause the processor to generate an optimized version of the managed runtime application based on the method invocation statistics. The processor is configured to generate the optimized application by: retrieving the managed runtime application, and selectively replacing bytecode for at least one method of a class of the managed runtime application with proxy code based on the method invocation statistics. The proxy code is configured for retrieving the replaced bytecode.

According to yet another aspect of the present disclosure, a computer implemented method is provided. A request to run a managed runtime application is received. The managed runtime application is executed with a profiling agent. The profiling agent records methods invoked during execution of the managed runtime application. Methods recorded as invoked by the profiling agent are stored as method invocation statistics, in response to an indication that execution of the managed runtime application is complete, for use in generating an optimized version of the managed runtime application.

According to still another aspect of the present disclosure, a computer implemented method is provided. A request to run a managed runtime application is received. An optimized version of the managed runtime application is executed with a feedback mechanism. The feedback mechanism records invocations of at least one of proxy code in the optimized application and classes removed from the optimized application during execution of the optimized application. The feedback mechanism optionally records methods invoked during execution of the optimized application. The feedback mechanism stores the recorded invocations, in response to an indication that execution of the optimized application is complete, for use in generating an updated optimized application.

DETAILED DESCRIPTION

Figure 1:
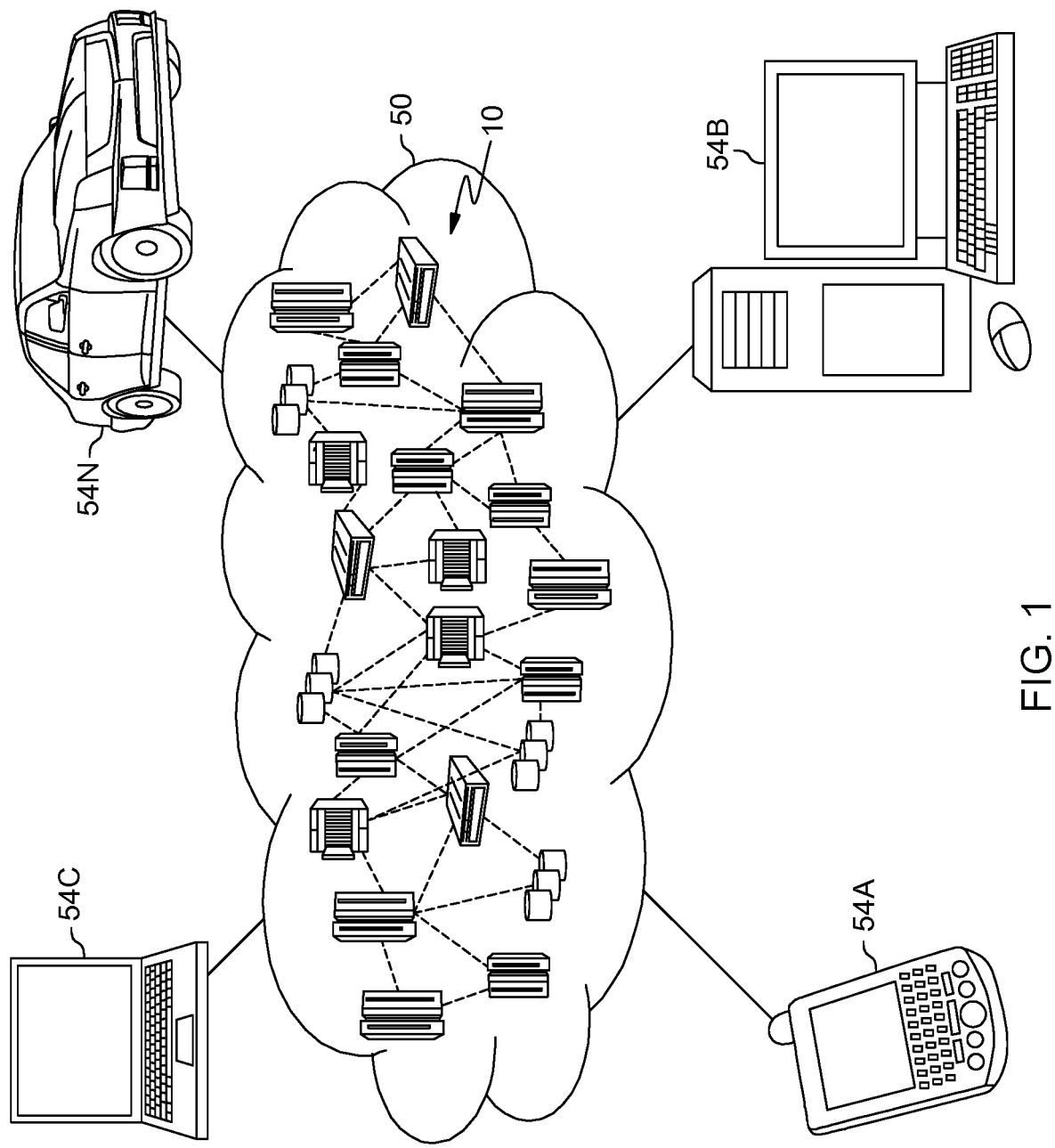
FIG. 1 illustrates a cloud computing environment according to an example implementation of the present disclosure.

It is to be understood that although the present disclosure includes a detailed description in relation to techniques for optimizing managed runtime applications in the context of cloud computing, implementation of the teachings of the present disclosure are not limited to a cloud computing. Moreover, whilst the present disclosure is concerned with techniques for optimizing managed runtime applications for improved performance in a serverless environment, the optimization techniques may equally be implemented in server-based environments whilst still deriving certain benefits from the disclosed optimizations. Accordingly, example implementations of the present disclosure are capable of being implemented in conjunction with any type of computing, processing and/or data storage environment, whether now known or developed in the future.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs)

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
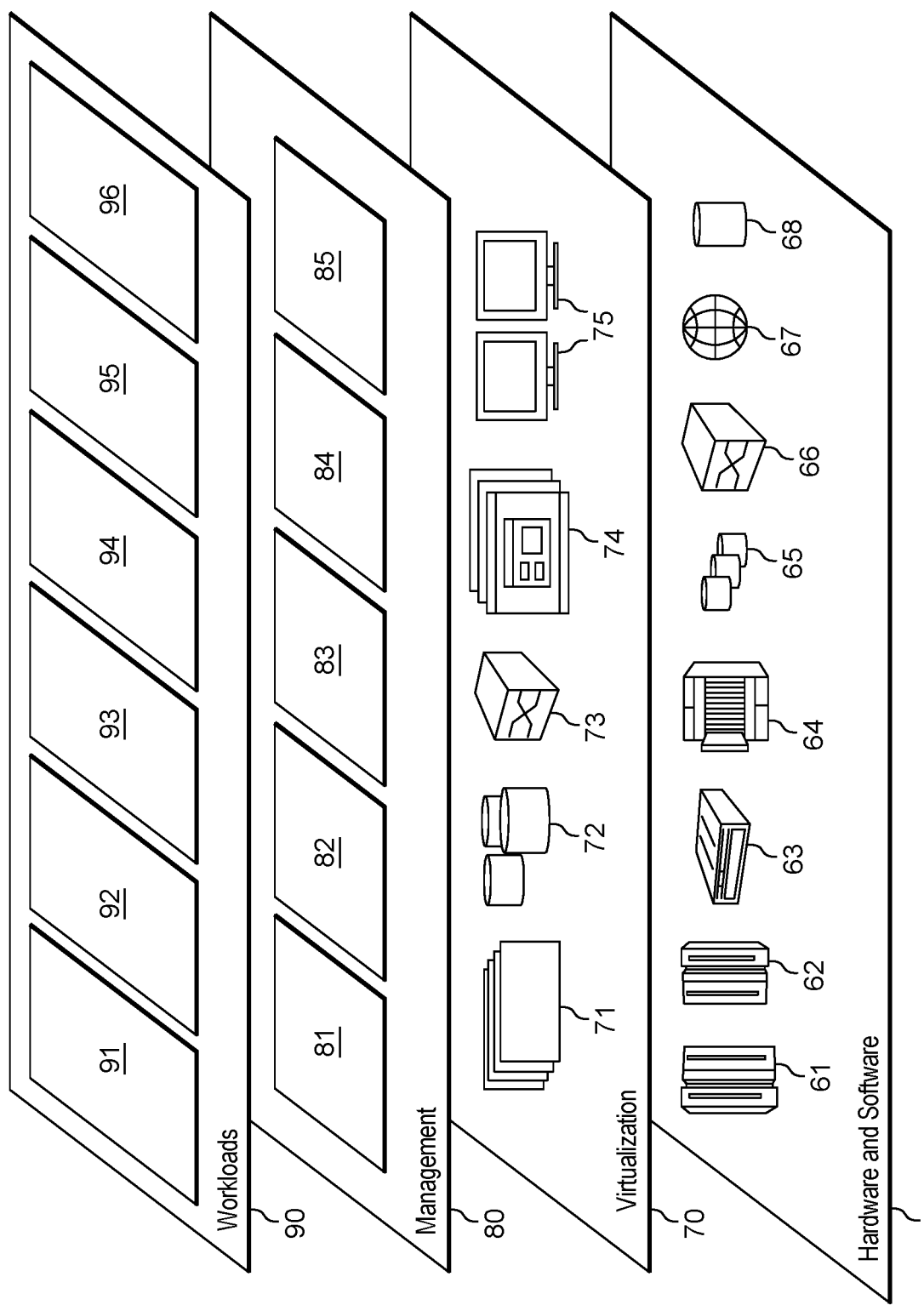
FIG. 2 illustrates abstraction model layers according to an example implementation of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and implementations of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some example implementations, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 and transaction processing 95.

Example implementations of the present disclosure include systems, methods and computer program products for optimizing managed runtime software applications to provide improved performance in a serverless environment, as discussed above. In modern programming, applications are often written for managed runtime environments and use intermediate code that is dynamically interpreted by the runtime each time the application is initialized and run. The runtime handles tasks such as memory allocation, heap management, security, class loading and garbage collection when running the application. The disclosed example implementations may be used for optimizing such a managed runtime application to improve execution parameters, such as increasing the speed of execution and reducing the resources consumed during execution, in order to improve performance in a serverless environment. In the Figures, the same or similar features are assigned the same or similar reference numerals.

Managed runtime software applications have a number of drawbacks when run in a serverless environment. An example managed runtime application is a class-based application written in an object-oriented programming language such as Java®. Class-based applications comprise code in an intermediate language composed of "classes" for execution by a runtime or "virtual machine". Each class is a template that defines the variables and the methods (functions) common to all examples of a certain kind or class. Thus, a class comprises data fields and executable instructions, sometimes called "bytecode", which implement one or more methods. When bytecode of a class is executed by the virtual machine, the corresponding method(s) of the bytecode are invoked. At startup, a virtual machine must spend time scanning the classes on the classpath, loading each class into local data storage and creating associated object instances (i.e., instantiation) before starting to execute the application. Thus, the startup time for the application, and the data storage, processing and power consumption required for startup, are dependent on the size of the class-based application (e.g., number and size of classes, bytecode, object instances etc). Typically, a class-based application comprises a large number of classes, with the size of each class dependent on the number and length of its fields and bytecode. In consequence, startup represents a significant proportion of the overall time taken to execute the program, and consumes a large amount of data storage, power and processing resource to load, and create object instances for, each and every class included in the application. This leads to lengthy execution time, inefficient consumption of service provider resources, and increased cost to the consumer for certain service models, when class-based applications are run in a serverless environment.

Whilst the above discussion concerns class-based applications, such as Java® applications, the above problems also apply to other managed runtime applications written in intermediate code, which similarly require the intermediate code to be examined, and corresponding executable instructions to be loaded, at startup. Thus, in the following description, terms such as "classes", "bytecode" and the like are used for ease of description, and are not intended to limit the present disclosure to any particular type of managed runtime application, language or intermediate code. Accordingly, it should be understood that the present disclosure is applicable to all types of managed runtime applications (for simplicity, also referred to as "runtime application").

Example implementations of the present disclosure concern improved systems, methods and computer program products that optimize managed runtime applications for a serverless environment to provide improved performance, such as reduced startup/execution time and resource consumption during initialization and execution.

As described below with reference to FIG. 3, a managed runtime application may be started, instantiated and run on a virtual machine created by a runtime in a serverless environment, with a profiling agent for profiling the application. In particular, a profiling agent is used to obtain "method invocation statistics" during execution of the application. For example, in the case of a class-based application, a modified core component of the virtual machine, e.g., a modified stack walker, may be configured to place a marker against methods in classes that are invoked during execution of the application. In other examples, a standard or custom Application Programming Interface (API) that records method invocations may be used. As the skilled person will appreciate, invoked methods of classes (or equivalent) may be recorded using other techniques. During shutdown of the virtual machine, the obtained statistics corresponding to invoked methods are stored. After a threshold number of executions of the application, the obtained method invocation statistics are sent to the serverless service for optimizing the application, as described below.

Figure 3:
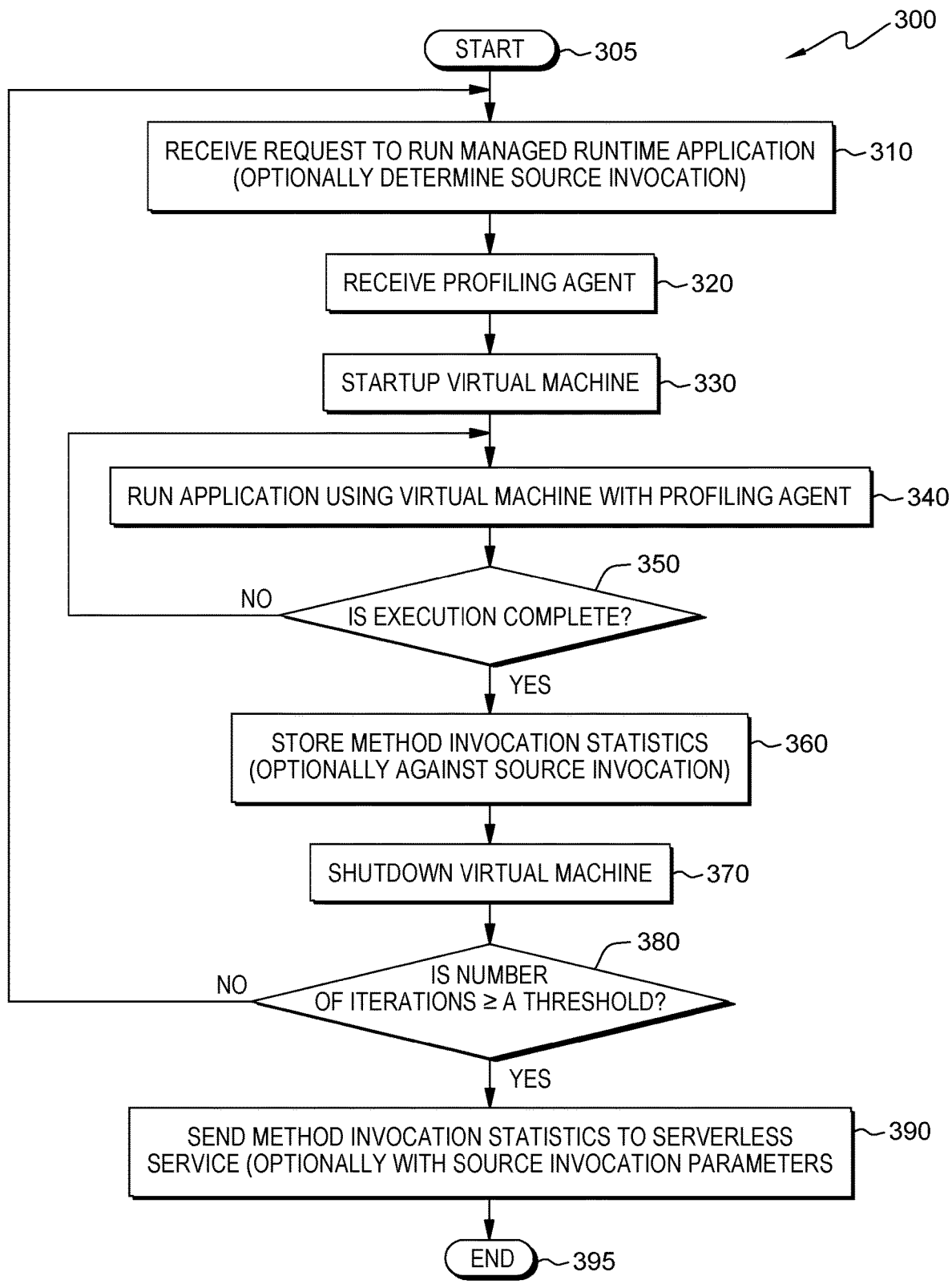
FIG. 3 illustrates a method for obtaining method invocation statistics for a managed runtime application according to an example implementation of the present disclosure.

FIG. 3 is a flowchart illustrating a method 300 for obtaining method invocation statistics for a managed runtime application according to an example implementation of the present disclosure. Method 300 is typically performed by a service provider of a service in a serverless environment, following deployment of a new runtime application by a consumer for execution by the service in the serverless environment. As the skilled person will appreciate, the execution of a particular managed runtime application is associated with an individual consumer and may be performed in response to different "source invocations" (e.g., different types of request from the consumer) as described below.

The method 300 starts at step 305 and step 310 receives a request to run a managed runtime application in a serverless environment. As the skilled person will appreciate, the runtime application comprises intermediate code executable by a suitable virtual machine. Typically, the request is from a consumer following deployment of a new runtime application. However, the method may equally be performed using an existing application in the serverless environment that has not previously been profiled for generating an optimized application. As the skilled person will appreciate, separate profiling may be performed, on the same managed runtime application, for different source invocations (e.g., different types of requests from the consumer). Thus, step 310 may optionally also determine the source invocation and associated parameters, based on the received request or otherwise.

At step 320, the method receives a profiling agent for profiling the application. In particular, the profiling agent is configured to record the methods invoked whilst running the application, as discussed above.

At step 330, the method starts up a virtual machine, and at step 340 starts to run the application using the virtual machine with the profiling agent. As the skilled person will appreciate, during execution of the application by the virtual machine, the profiling agent records method invocations against corresponding intermediate code (e.g., classes and associated bytecode) as described above. As the skilled person will appreciate, the profiling agent may keep a separate record of the invocations of each method of a class, which corresponds to the invocation of the bytecode corresponding to the method. Accordingly, in the following description, the term "bytecode method" is used to refer an individual method of a class, which is invoked by the execution of corresponding bytecode.

At optional step 350, the method determines whether execution of the application is complete. For example, step 350 may be performed continuously or periodically. If step 350 determines that the execution of the application is not complete, the method returns to step 340 and continues to run the application. Alternatively, if step 350 determines that the execution of the application is complete, the method continues with step 360.

At step 360, the method stores the method invocation statistics. The method invocation statistics may include, for example, an identifier for each method that was invoked during execution of the application (e.g., with reference to a class and bytecode, or equivalent), and the number of times the method was invoked. At step 370, the method shuts down the virtual machine.

At optional step 380, the method considers whether the runtime application has completed a threshold number of profiling iterations. For example, a threshold number of executions of the managed runtime application with the profiling agent may be needed to obtain a statistically meaningful set of method invocation statistics to enable optimization of the runtime application at a desired level of accuracy. Accordingly, the method 300 of FIG. 3 may maintain and increment a counter (not shown), for each iteration of steps 310 to 370 (i.e., each execution of the runtime application with the profiling agent), and step 380 may compare the count recorded in the counter with a predefined threshold. If step 380 determines that the number of profiling iterations is greater than or equal to the threshold, the method proceeds to step 390. Alternatively, if step 380 determines that the number of profiling iterations is less than the threshold, the method returns to step 310 and waits for the next request from the consumer to run that the managed runtime application.

At step 390, the method sends the method invocation statistics to the service provider for the serverless service for optimization of the managed runtime application and, at step 395 the method ends.

The above described example implementation may use any suitable profiling agent, such as a modified stack walker or API, to perform profiling of the managed runtime application. As the skilled person will appreciate, other types of profiling agent and/or technique may be used for obtaining profiling information, and, in particular, for obtaining the above-described method invocation statistics. Accordingly, the present disclosure contemplates implementations that employ any suitable profiling agent or technique, whether now known or developed in the future.

As described below with reference to FIG. 4, the serverless service of the service provider receives the method invocation statistics for the runtime application and generates an optimized application. The optimized application is then to be used by the serverless service to startup, instantiate and execute the runtime application in response to future consumer requests, for improved performance in the serverless environment. As the skilled person will appreciate, the term "optimized application" refers to a modified version of the intermediate code of the runtime application that is adapted or customized for improved performance in a serverless environment.

In accordance with the present disclosure, the generation of an optimized application for a runtime application uses a combination of techniques, which together lead to improved performance in a serverless environment. In particular, the inventors have realized that the optimization of a managed runtime application for running in a serverless environment needs to strike a balance two conflicting strategies for reducing overall execution time and resource consumption in the serverless environment. The strategies are discussed below with reference to a class-based application for ease of description. As the skilled person will appreciate, the strategies apply equally to other types of managed runtime application.

A first strategy is to reduce the total amount of classes and corresponding bytecode (or equivalent) in the optimized application. As described above, the time for startup of a managed runtime application is directly proportional to the number and size of classes and corresponding bytecode. Accordingly, reducing the total size of the intermediate code comprising classes and bytecode, reduces startup time associated with loading the classes and creating corresponding object instances, and also reduces the amount of memory consumed thereby. To implement this first strategy, the inventors propose selectively removing, from the original runtime application, classes and/or bytecode that are not invoked, in practice, (e.g., when running the application in response to a particular source invocation). Example implementations of the present disclosure selectively replace bytecode for methods of a class in the intermediate code of the runtime application with proxy code in the optimized application for improved execution performance in a serverless environment. In addition, some example implementations of the present disclosure selectively remove classes in the intermediate code of the runtime application from the optimized application for improved execution performance in a serverless environment. These example implementations are described in detail below.

The second strategy is to reduce unnecessary remote accesses to classes and bytecode during execution of the optimized application. As described above, runtime applications may need to access classes from a remote location (e.g., over a network) which can lead to delays and the risk of connection failures, and thus increase the overall execution time. To implement this second strategy, the inventors propose selectively adding or retaining intermediate code comprising classes and bytecode that is invoked, in practice (e.g., when running the application in response to a particular source invocation). Example implementations of the present disclosure selectively add intermediate code into the optimized application for improved execution performance in a serverless environment, as described in detail below.

Example implementations of the present disclosure use received method invocation statistics, obtained when running the original runtime application (e.g., as described above with reference to FIG. 3), to provide a balanced implementation of the above first and second strategies to generate an initial optimized application.

Example implementations of the present disclosure further include a feedback mechanism, which provides method invocation statistics as feedback from running the optimized application, as described in detail below with reference to FIG. 5. Accordingly, example implementations of the present disclosure use received feedback to provide a balanced implementation of the above first and second strategies to generate an updated optimized application, as described below.

An example implementation, which combines techniques to balance the above first and second strategies for generating an optimized application, is described below with reference to FIG. 4. In particular, FIG. 4 relates to the generation of an optimized application of a class-based application for ease of description. As the skilled person will appreciate, the principles apply equally to other types of managed runtime application.

Figure 4:
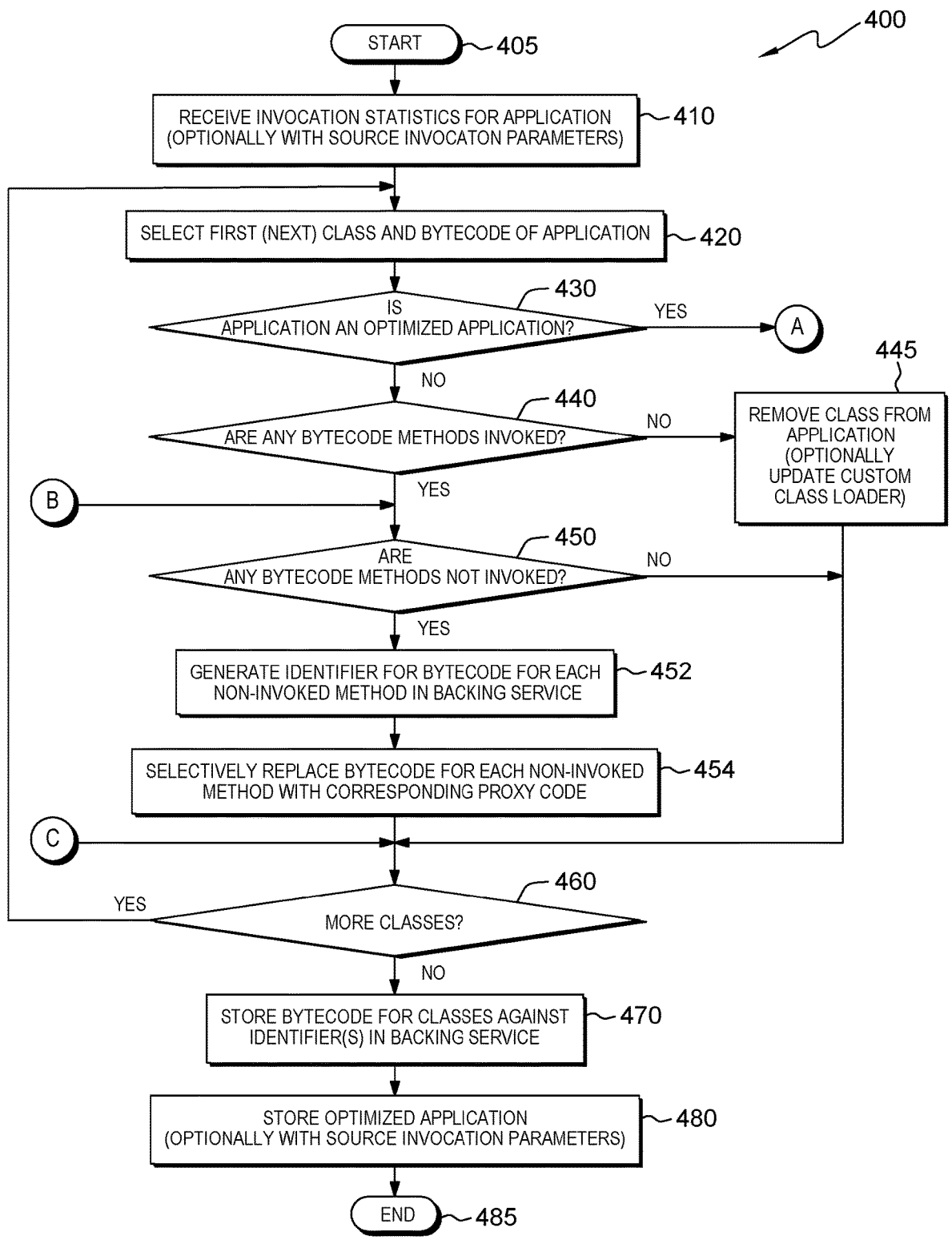
FIG. 4 illustrates a method for generating and updating an optimized managed runtime application for a serverless environment according to an example implementation of the present disclosure.

FIG. 4 is a flowchart illustrating a method 400 for generating or updating an optimized version of a managed runtime application (herein "optimized application") for a serverless environment according to an example implementation of the present disclosure. Method 400 is typically performed by a service provider of a serverless service in response to a consumer request to execute the runtime application in a serverless environment. Accordingly, method 400 may be performed in response to step 390 of the method 300 of FIG. 3 or in response to a subsequent consumer request. Equally, the method 400 may be triggered by the service provider at any time.

The method 400 starts at step 405 and step 410 receives invocation statistics for a managed runtime application. The managed runtime application may be the original runtime application, in which case the invocation statistics comprise method invocation statistics obtained from running the original runtime application. Alternatively, the managed runtime application may be a current optimized application, in which case the invocation statistics are obtained and provided by feedback from running the optimized application. Optionally, step 410 may also receive source invocation parameters for the managed runtime application, as described above. Accordingly, the method 400 of FIG. 4 may be used to generate an optimized application for the managed runtime application for each type of source invocation, and thus may associate the optimized application with a particular source invocation having corresponding source invocation parameters.

At step 420, the method selects a first class and associated bytecode of the managed runtime application. In some example implementations, step 420 selects a class from all the classes present in the original managed runtime application. In other example implementations, step 420 selects a class from all the classes present in the current optimized application together with any additional classes present in the received invocation statistics. Step 430 considers whether the managed runtime application is an optimized application. In particular, when the runtime application is an optimized application, the received invocation statistics are provided by a feedback mechanism and may include statistics relating to the invocation of proxy code and removed classes as well as the invocation of bytecode methods, as described below. Accordingly, if step 430 determines that the managed runtime application is an optimized application, the method proceeds to perform processing in relation to the invocation of proxy code and/or removed classes in accordance with a method 600 described below with reference to FIG. 6. Alternatively, if step 430 determines that the managed runtime application is not an optimized application, the method proceeds to step 440.

Step 440 determines whether any bytecode methods for the selected class are invoked, according to the method invocation statistics of the received invocation statistics. In particular, step 440 may determine whether at least one bytecode of the selected class is present (i.e., recorded) in the received method invocation statistics. If step 440 determines that no bytecode methods of the selected class are present in the method invocation statistics, the method continues with step 445. However, if step 434 determines that at least one bytecode method of the selected class is recorded as invoked in the method invocation statistics, the method proceeds to step 450.

At step 445, the method removes the class from the managed runtime application. As the skilled person will appreciate, the absence of at least one bytecode of the selected class in the method invocation statistics indicates that the method(s) associated with the bytecode are not invoked during execution of the application. Thus, the time associated with loading the selected class at startup is unnecessary. By omitting the entire class from the optimized application, the size of the application is reduced in accordance with the above first strategy. This enables a reduction in the startup time and memory and processing resource consumption for improved performance in a serverless environment.

In addition, step 445 optionally updates a custom class loader, associated with the managed runtime application, with an indication that the entire class has been removed. As the skilled person will appreciate, a custom class loader may be provided for a managed runtime application to be used by a virtual machine during execution thereof to provide consumer or service provider-specific customization requirements. Accordingly, a custom class loader can be utilized to provide a mechanism to enable a class, which has been removed from an optimized version of a runtime application, to be retrieved (e.g., from a remote location) if it is unexpectedly called during execution thereof. Typically, during execution of a runtime application, if a class is called that has not been loaded upon startup, a "class not found" exception may occur. Thus, in some example implementations, the custom class loader includes a list of identified classes that have been removed from the optimized application, so as to enable retrieval thereof in the event of a "class not found" exception. As the skilled person will appreciate, the use of a custom class loader, configured to load the identified classes in the list of classes that have been removed from a runtime application, may enable fast and efficient handling of a "class not found" exception condition. In other example implementations, alternative (e.g., conventional) mechanisms for handling a "class not found" exception may be used.

At step 450, the method determines whether any bytecode methods for the selected class are not invoked according to the received method invocation statistics. As the skilled person will appreciate, a particular class may comprise bytecode for a plurality of corresponding methods, only some of which are invoked, in practice. Accordingly, step 450 may determine whether any bytecode methods of the selected class are not present (e.g., not recorded as invoked) in the method invocation statistics. If step 450 determines that one or more bytecode methods for the class are not invoked, the method proceeds to perform steps 452 and 454. Alternatively, if step 450 determines there are no bytecode methods for the selected class that are not invoked (i.e., all the bytecode methods in the class are invoked), then, in accordance with the above second strategy, the entire class and corresponding bytecode should be retained in the optimized application for loading upon startup, and the method proceeds to step 460.

In steps 452 and 454, the method selectively replaces the bytecode corresponding to the method(s) for the class that are not invoked with proxy code. In particular, for each non-invoked bytecode method of the selected class, step 452 generates an identifier for the bytecode in a backing service (e.g., remote data store/class library), and step 454 replaces the bytecode with proxy code including the identifier in the optimized application. The method then continues with step 460.

As the skilled person will appreciate, in accordance with the present disclosure, proxy code is configured to load the missing (i.e., replaced) bytecode for the class from another location in the event of a "bytecode not found" exception condition. In particular, a "bytecode not found" exception condition occurs when the bytecode for a class has not been loaded at startup and there is an unexpected requirement for the bytecode during execution of the managed runtime application. By omitting non-invoked bytecode for a class from the optimized application, and replacing it with proxy code that typically has a smaller size/resource requirement, the overall size of the application is reduced in accordance with the above first strategy. This enables a reduction in the startup time and memory and processing resource consumption for improved performance in a serverless environment. As the skilled person will appreciate, the use of proxy code, configured to load the replaced bytecode, enables fast and efficient handling in the event of a "bytecode not found" exception condition.

In certain example implementation, proxy code is used selectively to ensure that replacement of bytecode with proxy code leads to an optimization improvement for the optimized application. For example, proxy code may be selectively inserted in the optimized application in place of the original bytecode based upon the size of the bytecode. In particular, if the size of the bytecode is equal to or above a threshold, steps 452 and 454 may be performed so as to insert proxy code in place of the bytecode in the optimized application. However, if the size of the bytecode is below the threshold, proxy code may not be used, and, instead, the bytecode may be maintained in the optimized application and step 452 and 454 may not be performed.

At step 460, the method determines whether there are more classes to consider in the managed runtime application. If step 460 determines that there are more classes to consider, the method returns to step 420, which selects the next class and bytecode of the runtime application. The method 400 then continues in a loop through steps 420 to 460, until step 460 determines that there are no more classes to consider. When step 460 determines that there are no more classes to consider, the method proceeds to step 470.

At step 470, the method stores the relevant bytecode against the identifiers generated in step 452 in the backing service (e.g., remote data store/class library). Thus, step 470 enables retrieval of the bytecode identified in the proxy code introduced in the optimized application. The method then proceeds to step 480.

Step 480 stores the optimized application in a data store (e.g., memory) of the service provider for the serverless service in the serverless environment, for execution in response to future consumer requests. Optionally, the optimized application may be stored with source invocation parameters, as described above. As the skilled person will appreciate, the optimized application may strategically omit classes and/or include proxy code in place of bytecode in relation to respective classes and methods, that are not expected to be invoked during execution of the managed runtime application, so as balance the above first and second conflicting strategies for improved execution performance in a serverless environment. The method then ends at step 485.

Figure 5:
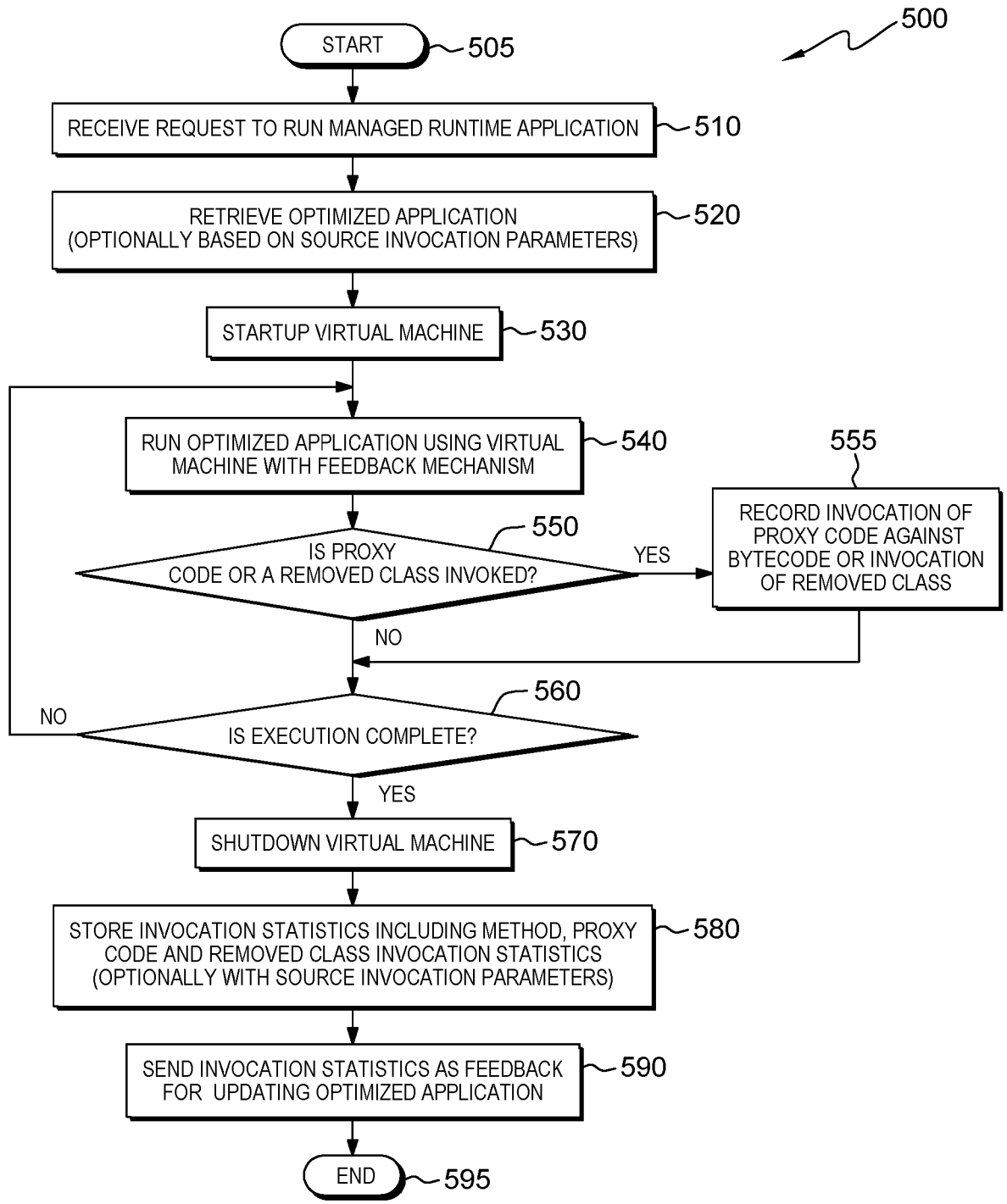
FIG. 5 illustrates a method for executing an optimized managed runtime application in a serverless environment according to an example implementation of the present disclosure.

FIG. 5 is a flowchart illustrating a method 500 for running an optimized application in a serverless environment according to an example implementation of the present disclosure. The optimized application may be generated using the method 400 of FIG. 4, for example, based on method invocation statistics obtained by the method 300 of FIG. 3, as described above or otherwise.

The method 500 starts at step 505 and step 510 receives a request to run the optimized application. In particular, step 510 is a consumer request to a serverless service provider to run the managed runtime application, and includes an identifier of the application, in accordance with conventional practices well known in the art.

At step 520, the method retrieves the optimized application corresponding to the identified managed runtime application. Optionally, in the case that multiple optimized versions of the managed runtime application are available to the consumer for different source invocations, step 520 retrieves the optimized application based on source invocation parameters associated with the request.

At step 530, the method starts up a virtual machine in the serverless environment. Accordingly, step 530 loads only the classes and bytecode present in the optimized application during the startup and instantiation process, thereby reducing the startup time. At step 540, the method runs the optimized application using the virtual machine in the serverless environment. In the example implementation of FIG. 5, method 500 includes a feedback mechanism, which operates during execution of the optimized application in step 540. In particular, the feedback mechanism obtains invocation statistics comprising "proxy code invocation statistics" relating to invocations of proxy code during execution of the optimized application, for use in updating the optimized application. In addition, or alternatively, the feedback mechanism obtains "removed class invocation statistics" relating to invocations of removed classes (as described herein) during execution of the optimized application, for use in updating the optimized application. In some example implementations, the feedback mechanism is implemented as a profiling agent for profiling the optimized application during execution thereof. For example, a profiling agent, such as a modified stack walker or suitable API, may be used for obtaining invocation statistics that may include proxy code and/or removed class invocation statistics, as well as method invocation statistics as described above with reference to the method 300 of FIG. 3. In other example implementations, the feedback mechanism is implemented in the proxy code of the optimized application. For example, the proxy code itself may be configured to record access to a data storage to retrieve the corresponding bytecode (i.e., invocation of the proxy code), such that each proxy code logs its invocation in a log or record of proxy code invocation statistics. In still further example implementations, the feedback mechanism is implemented by an exception handling mechanism, such as a custom class loader as described above. For example, an exception handling mechanism may log or record invocations of proxy code and/or removed classes in exception conditions to obtain proxy code and/or removed class invocation statistics. In some embodiments, the feedback mechanism may be implemented using a combination of two or more of the above techniques. Other forms of feedback mechanism are possible and contemplated.

As the skilled person will appreciate, the feedback mechanism may encounter the invocation of proxy code, to invoke corresponding method(s), when running the optimized application. In particular, as described above in relation the method 400 of FIG. 4, when generating an optimized application, bytecode methods that are not invoked may be replaced by proxy code that enables the retrieval of the corresponding bytecode from a backing service in an exception condition. Accordingly, if the feedback mechanism encounters the invocation of proxy code, this needs to be provided as feedback. Similarly, the feedback mechanism may encounter the invocation of a "removed class", when running the optimized application. As described herein, a "removed class" is a class that was included in the original runtime application but is not present in the optimized application. In particular, as described above in relation to the method 400 of FIG. 4, when generating an optimized application, classes that are not invoked may be removed entirely from the optimized application and, optionally, identified in a custom class loader (step 445). Accordingly, if the feedback mechanism encounters the invocation of a removed class, this also needs to be provided as feedback. Furthermore, in the illustrated example implementation, the feedback mechanism also obtains method invocation statistics as described above in relation to the method 300 of FIG. 3.

Accordingly, step 550 determines whether proxy code or a removed class has been invoked. For example, step 550 may be performed continuously or periodically using the feedback mechanism. If step 550 determines that no proxy code or removed class has been invoked, the method proceeds to optional step 560. However, if step 550 determines that proxy code or a removed class has been invoked, the method continues with step 555, which records the invocation of the proxy code against the corresponding bytecode or the invocation of the removed class, and associated information, before proceeding to optional step 560.

At optional step 560, the method determines whether execution of the application is complete. For example, step 560 may be performed continuously or periodically. If step 560 determines that the execution of the application is not complete, the method returns to step 540 and continues to run the optimized application. If step 560 determines that the execution of the optimized application is complete, the method continues with step 570, which shuts down the virtual machine.

At step 580, the method stores the invocation statistics obtained by the feedback mechanism, including method invocation statistics and proxy code and/or removed class invocation statistics recorded in step 555. Step 590 sends the invocation statistics to the serverless service provider as feedback, for use in updating the optimized application, for example using the method 400 of FIG. 4. Step 590 may be performed every time the optimized application is run, or after a predetermined number of executions of the optimized application. Alternatively, step 590 may be performed periodically, in response to a request for feedback or otherwise, according to application requirements. The method 500 then ends at step 595.

As the skilled person will appreciate, the feedback from step 590 may be used to update the optimized application using the method 400 of FIG. 4. In particular, as described above, step 430 of the method 400 of FIG. 4 determines whether the application, for which invocation statistics are received in step 410, is an optimized application. Thus, step 430 determines that the application is an optimized application when it receives feedback from step 590 of the method 500 of FIG. 5, and thus continues with the method 600 of FIG. 6, as described below.

Figure 6:
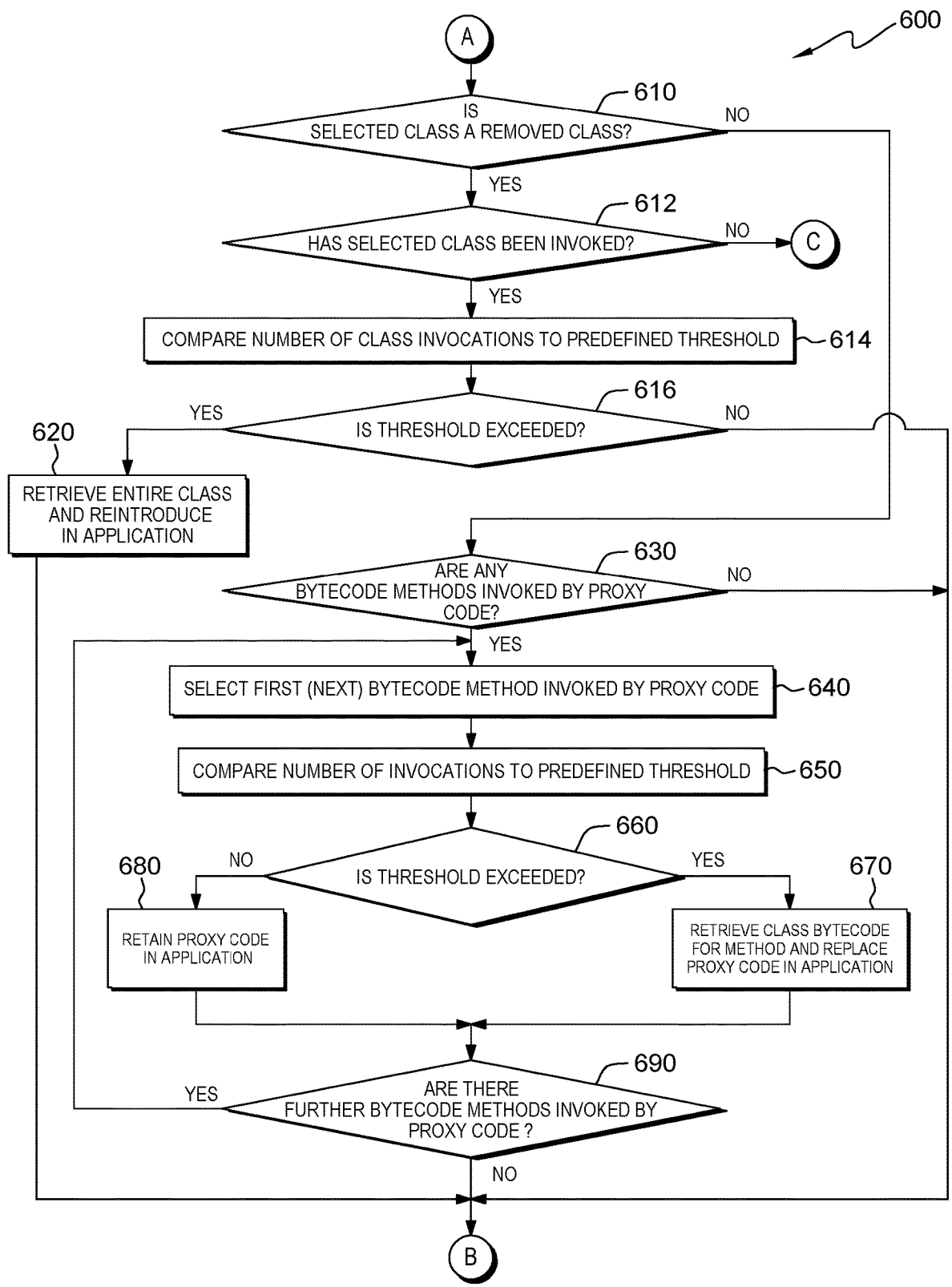
FIG. 6 illustrates a method for updating an optimized managed runtime application for a serverless environment, which may be implemented in the method of FIG. 4, according to an example implementation of the present disclosure.

FIG. 6 is a flowchart illustrating a method 600 for updating an optimized application for a serverless environment according to an example implementation of the present disclosure. Method 600 is typically performed by a service provider of a serverless service in response to receiving invocation statistics comprising method invocation statistics, and additional invocation statistics for proxy code and removed classes as described above, as feedback obtained when running the optimized application, for example using the method 500 of FIG. 5. In particular, method 600 may be performed as a part of the method of the example implementation of the method 400 of FIG. 4.

Thus, the method 600 starts at A, following selection of a class (step 420 of FIG. 4) and determination that the application is an optimized application (step 430 of FIG. 4). At step 610, the method determines whether the selected class corresponds to a "removed class". If step 610 determines that the selected class is not a removed class (i.e., the selected class is present in the optimized application) the method proceeds to step 630. However, if step 610 determines that the selected class is a removed class, the method proceeds to step 612. At step 612, the method determines whether the selected class is invoked, according to the received feedback. If step 612 determines that the feedback indicates that the class is invoked (e.g., at least one bytecode method of the class is invoked), the method proceeds to steps 614 and 616. However, if step 612 determines that the removed class is not invoked, then no further action is required in relation to the removed class (i.e., the class is not required in the optimized application). Accordingly, the method then proceeds to C, which returns to step 460 of the method 400 of FIG. 4 for selection of the next class.

Steps 614 and 616 consider whether the selected class, which was present in the original runtime application but is not present in the optimized application, should be reintroduced into the optimized application to optimize performance. In particular, step 614 compares the number of invocations of the removed class to a predefined threshold, and step 616 determines whether the number of invocations of the removed class is greater than or equal to the predetermined threshold. If step 616 determines that the number of invocations of the removed class is greater than or equal to the threshold, the method proceeds to step 620. Step 620 retrieves the entire class from the backing service (e.g., remote data store/class library) and reintroduces the retrieved class in the updated optimized application. The method then proceeds to B, which returns to step 450 of the method 400 of FIG. 4 to consider whether any bytecode methods of the class are not invoked and can be replaced by proxy code for further optimization. If step 616 determines that the number of invocations of the removed class is less than the threshold, the method proceeds to step 640.

As the skilled person will appreciate, the predefined threshold used in steps 614 and 616 is selected to balance the conflicting first and second strategies discussed above. In particular, when the number of invocations of a removed class exceeds the threshold, it is considered that: (i) the additional execution time associated with the number of invocations to retrieve the entire class is likely to be greater than the additional startup time associated with including the class in the optimized application for loading at startup, and/or (ii) the number of invocations to retrieve the class leads to an unacceptably high risk of connection delays and failures. Thus, in this case, the class (but not necessarily all associated bytecode, as discussed below) is selectively included in the updated optimized application for use in a serverless environment so as to optimize performance. In contrast, when the number of invocations of a removed class is below the threshold, it is considered that: (i) the increase in startup time associated with the inclusion of the class in the optimized application is greater than the execution time for the number of invocations to retrieve the class, and/or (ii) the number of invocations to retrieve the class has an acceptably low risk of connection delays and failures. Thus, in this case, the entire class is selectively omitted from the updated optimized application for use in a serverless environment so as to optimize performance. In some example implementations, a single invocation of a removed class is indicative of the inclusion of the class in the updated optimized application (i.e., the predetermined threshold is 1 (one)), and steps 614 and 616 may be omitted.

At step 630, the method determines whether any bytecode methods of the selected class are invoked by proxy code, according to the received feedback. In particular, step 630 may determine whether or not any proxy code invocations are present in proxy code invocation statistics, which indicates the invocation of proxy code and corresponding bytecode method(s). If step 630 determines that no bytecode methods of the selected class are invoked by proxy code, the method 600 ends at B. Alternatively, if step 630 determines that bytecode methods of the class are invoked by proxy code, the method proceeds to step 640.

Steps 640 to 690 consider whether the bytecode for the methods of the selected class that are invoked by proxy code, as indicated in proxy code invocation statistics, should be reintroduced into the optimized application to optimize performance. At step 640, the method selects a first bytecode method invoked by proxy code of the selected class. Step 650 compares the number of times that the bytecode method is invoked with a predetermined threshold, and step 660 determines whether the number of times that the bytecode method is invoked is greater than or equal to the predetermined threshold. If step 660 determines that the number of times that the bytecode method is invoked is greater than or equal to the threshold, the method proceeds to step 670.

Step 670 retrieves the bytecode of the class for the method for inclusion in the updated optimized application. In particular, step 670 retrieves the bytecode, for example, using the above-mentioned identifier for the backing service and replaces the proxy code with the retrieved bytecode in the updated optimized application.

Alternatively, if step 660 determines that the number of times the bytecode method is invoked is below the predetermined threshold, the method proceeds to step 680 which retains the proxy code in the updated optimized application. In particular, the proxy code is retained in place of the bytecode in the updated optimized application.

As the skilled person will appreciate, the predefined threshold used in steps 650 and 660 is selected to balance the conflicting first and second strategies discussed above. In particular, when the number of proxy code invocations exceeds the threshold, it is considered that: (i) the additional execution time associated with the number of proxy code invocations to retrieve the bytecode is likely to be greater than the additional startup time associated with including the bytecode in the optimized application for loading at startup, and/or (ii) the number of proxy code invocations leads to an unacceptably high risk of connection delays and failures. Thus, in this case, the actual bytecode is selectively included in the updated optimized application for use in a serverless environment so as to optimize performance. In contrast, when the number of proxy code invocations is below the threshold, it is considered that: (i) the increase in startup time associated with the inclusion of the bytecode in the optimized application for loading at startup is greater than the execution time for the number of proxy code invocations, and/or (ii) the number of proxy code invocations has an acceptably low risk of connection delays and failures. Thus, in this case, the proxy code is selectively included in the optimized application for the use in a serverless environment so as to optimize performance. In some example implementations, a single invocation of a bytecode method of the class is indicative of the inclusion of the bytecode in the updated optimized application and, conversely, no invocation of a bytecode method of the class if indicative of the replacement of the bytecode with proxy code in the updated optimized application (i.e., the predetermined threshold is 1 (one)). In this case, steps 640 to 680 may be modified, accordingly.

Following step 670 or step 680, the method proceeds to step 690. Step 690 determines whether there are further bytecode methods invoked by proxy code for the selected class to consider. If step 670 determines that there are further proxy code-invoked bytecode methods to consider, the method returns to step 640, which selects the next bytecode method invoked by proxy code for the selected class. Thus, method 600 continues in a loop through steps 640 to 690 until step 690 determines that there are no further proxy code-invoked bytecode methods to consider. The method 600 then proceeds to B, which returns to step 450 of the method 400 of FIG. 4, to consider any non-invoked bytecode methods of the selected class.

As the skilled person will appreciate, by continually updating the optimized application based on feedback (i.e., invocations statistics comprising statistics for the invocation of proxy code and/or removed classes and, optionally, method invocation statistics) obtained from its execution in the serverless environment, further improvements in performance may be achieved.

Figure 7:
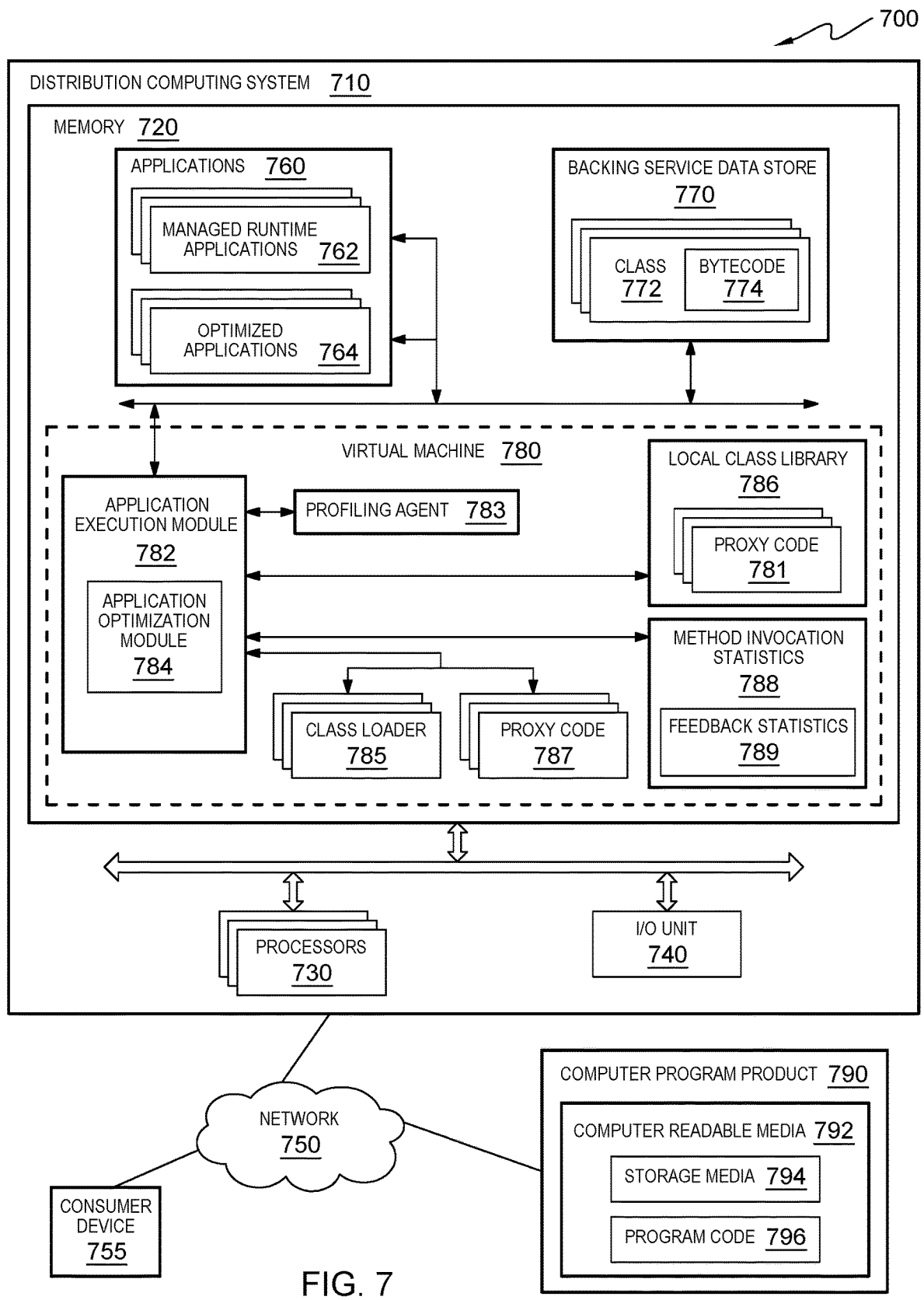
FIG. 7 illustrates a system according to an example implementation of the present disclosure.

FIG. 7 is a block diagram showing a serverless environment 700 of a service provider according to an example implementation of the present disclosure. Serverless environment 700, which may be a cloud computing environment as described above, includes a distributed computing system 710 of a service provider comprising memory 720, processors 730 and input/output (I/O) unit 740. I/O unit 740 provides connectivity to a network 750 for communication with external network devices such as consumer device 755. Network 750 may comprise any suitable wired or wireless communications network, such as the Internet.

Distributed computer system 710 of the example implementation shown in FIG. 7 is configured to execute managed runtime software applications received from a consumer in the serverless environment 700. For example, distributed computing system 710 may receive a consumer request from consumer device 755 via network 750 and I/O unit 740 to execute an identified managed runtime application deployed in the serverless environment 700. As described above, a consumer request may be associated with a particular type of source invocation from the consumer.

Memory 720 of distributed computer system 710 stores data and instructions for executing managed runtime applications in the serverless environment. In addition, in accordance with the present disclosure, memory 720 stores data and instructions for generating and executing optimized versions of managed runtime applications (i.e., optimized applications) to enable more efficient execution, and thus improved performance, in the serverless environment, as described above.

In particular, memory 720 stores applications 760 comprising managed runtime applications 762 received from consumers, and corresponding optimized applications 764 that are generated and updated using methods in accordance with the present disclosure, as described above. Memory 720 further includes backing service data store 770 that stores class files comprising classes 772 and corresponding bytecode 774 relating to classes and methods that are not normally invoked when running the managed runtime application. Finally, memory 720 comprises a virtual machine 780 for executing applications 760 (i.e., a managed runtime application 762 or an optimized application 764) in the serverless environment 700, in response to consumer requests. Applications 720 are typically stored in memory that is local to virtual machine 780, whilst backing service data store 770 may be stored in memory local to the virtual machine or at a location remote from the virtual machine (e.g., requiring remote access over a network).

As the skilled person will appreciate, virtual machine 780 is dynamically created upon runtime and assigned resources as well known in the art. Virtual machine 780 comprises application execution module 782 and class loaders 785. Application execution module 782 comprises instructions for retrieving and executing applications 760, such as managed runtime applications 762 and optimized applications 764. In particular, at startup and instantiation of an application 760, application execution module 782 retrieves and scans the application 760, loads classes and corresponding bytecode to a local class library 786, generates associated object instances, and then executes the intermediate code using an appropriate interpreter (not shown) and at least one processor 730, as well known in the art. In addition, in accordance with the present disclosure, application execution module 782 is configured to obtain invocation statistics during execution of applications 760. In particular, application execution module 782 is configured to implement a profiling agent 783, when executing applications 760 to obtain invocation statistics 788, which may include method invocation statistics 788 and feedback invocation statistics 789 such as proxy code and/or removed class invocation statistics, as described above. For example, application execution module 782 may be configured to perform one or more of the methods of FIGS. 3 and 5 described above.

In accordance with the present disclosure, application execution module 782 further includes application optimization module 784 for generating and updating corresponding optimized applications 784. For example, application optimization module 784 may be configured to perform one or more of the methods of FIGS. 4 and 6 described above. In particular, application optimization module 784 may be configured to use method invocation statistics 788, which may comprise feedback invocation statistics 789, to generate optimized versions 764 of managed runtime applications 762. In particular, application optimization module 784 may selectively introduce proxy code 787 in place of bytecode in optimized applications 784 and/or selectively remove classes from optimized applications 784, as described herein. Thus, application optimization module 784 may generate and store proxy code 787 for selective inclusion in optimized applications 784 as described above. In addition, class loaders 785 may include a custom class loader configured to maintain a list of removed classes as described above.

In example implementations of the present disclosure, a computer program product 790 may be provided, as shown in FIG. 7. The computer program product 790 may include a computer readable media 792 having storage media 794 and program instructions 796 (i.e., program code) embodied therewith. The program instructions 796 may be loaded into memory 720 of distributed computing system 710 via I/O unit 740. In particular, the program instructions 796 may comprise the above-described application execution module 782 and/or application optimization module 784 of virtual machine 780, and may optionally include profiling agent 783, custom class loaders 785 and/or proxy codes 787. The program instructions 796 may be executable by one or more processors 730 to perform processing as described above with reference to FIGS. 3, 4, 5 and/or 6.

As indicated above, example implementations of the present disclosure optimize a managed runtime application for more efficient execution performance in serverless environments. In particular, example implementations generate an optimized application having increased speed of startup, instantiation and/or overall execution time, and reduced consumption of memory, processing, power and network resources during execution. In particular, the optimized application includes only the classes and corresponding bytecode that are invoked, in practice, during execution of the managed runtime application. The consequent reduction in the size and number of classes in the application optimizes the amount of memory used for loading classes and object instances, and reduces processing load (e.g., CPU consumption) for loading classes and creating object instances upon startup, instantiation and throughout execution. This, in turn, leads to reduced instantiation and startup time of the managed runtime application, which represents a significant proportion of the overall execution time. Nevertheless, the reduction in the size and number of classes in the application is balanced against the need for remote accesses to classes and bytecode that have been removed from the optimized application, which may lead to increased execution time due to delays arising from remote accesses. The optimized application is continually updated, based on feedback, so as to maintain this balance to enable optimization for up-to-date conditions.

The present disclosure encompasses a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration but are not intended to be exhaustive or limited to the implementations disclosed. Many modifications and variations will be apparent to those of ordinary skill in the art without departing from the scope and spirit of the described example implementations. The terminology used herein was chosen to best explain the principles of the example implementations, the practical application or technical improvement over technologies found in the marketplace, or to enable others of ordinary skill in the art to understand the example implementations disclosed herein.

What is claimed is:

1. A computer-implemented method comprising:
receiving method invocation statistics for a managed runtime application, wherein:
the managed runtime application comprises code,
the code comprises a plurality of classes,
each class of the plurality of classes includes a corresponding bytecode for one or more methods associated with each class,
the method invocation statistics identify at least one method of the one or more methods invoked during at least one previous execution of the managed runtime application; and
generating an optimized version of the managed runtime application based on the method invocation statistics by:
retrieving the managed runtime application, and
selectively replacing a first bytecode for the at least one method of a first class of the plurality of classes of the managed runtime application with proxy code based on the method invocation statistics, wherein the proxy code is configured for retrieving the first bytecode.

2. The computer-implemented method of claim 1, wherein the first bytecode for the at least one method of the first class of the managed runtime application is replaced with the proxy code in response to determining that the at least one method is not invoked during execution of the managed runtime application based on the method invocation statistics.

3. The computer-implemented method of claim 2, wherein the first bytecode for the at least one method of the first class of the managed runtime application is selectively replaced with the proxy code further based on a size of the first bytecode.

4. The computer-implemented method of claim 1, further comprising:
generating an identifier for a location of the first bytecode in a data storage;
generating the proxy code for retrieving the first bytecode from the location in the data storage, and
storing the first bytecode at the location in the data storage.

5. The computer-implemented method of claim 1, wherein generating the optimized version of the managed runtime application further comprises:
selectively removing the first class of the managed runtime application in response to determining that the first class is not invoked during execution of the managed runtime application based on the method invocation statistics.

6. The computer-implemented method of claim 5, further comprising:
updating a custom class loader associated with the managed runtime application with an identifier of the first class.

7. The computer-implemented method of claim 1, further comprising:
receiving invocation statistics for the optimized version, wherein:
the invocation statistics are selected from the group consisting of identifying at least one invocation of the proxy code and identifying at least one invocation of the first class,
the first class was present in the managed runtime application but is not present in the optimized version, and
the invocation statistics are obtained during at least one previous execution of the optimized version; and
generating an updated version of the optimized version based on the invocation statistics.

8. The computer-implemented method of claim 7, wherein generating the updated version comprises:
comparing a number of invocations of the proxy code with a corresponding predefined threshold; and
responsive to the number of invocations of the proxy code being greater than or equal to the predefined threshold, retrieving the first bytecode associated with the proxy code and replacing the proxy code in the optimized version with the first bytecode.

9. The computer-implemented method of claim 7, wherein generating the updated version comprises:
comparing a number of invocations of the first class with a corresponding predefined threshold, and
responsive to the number of invocations of the first class being greater than or equal to the predefined threshold, retrieving the first class and reintroducing the first class in the optimized version.

10. The computer-implemented method of claim 1, further comprising:
determining source invocation parameters for the method invocation statistics, wherein the source invocation parameters are associated with a corresponding source request for executing the managed runtime application; and
storing the optimized version of the managed runtime application with the source invocation parameters for execution in response to future source requests to run the managed runtime application.

11. The computer-implemented method of claim 1, further comprising:
receiving a request to run the managed runtime application;
executing the managed runtime application with a profiling agent, wherein the profiling agent records the one or more methods invoked during execution of the managed runtime application, and
in response to an indication that the execution of the managed runtime application is complete, storing the one or more methods recorded by the profiling agent as method invocation statistics for use in generating the optimized version of the managed runtime application.

12. A computer system comprising:
one or more computer processors;
one or more computer-readable storage media;
program instructions stored on the computer-readable storage media for execution by at least one of the one or more processors, the program instructions comprising:
program instructions to receive method invocation statistics for a managed runtime application, wherein:
the managed runtime application comprises code,
the code comprises a plurality of classes, each class of the plurality of classes includes a corresponding bytecode for one or more methods associated with each class, the method invocation statistics identify at least one method of the one or more methods invoked during at least one previous execution of the managed runtime application; and program instructions to generate an optimized version of the managed runtime application based on the method invocation statistics by:

retrieving the managed runtime application, and selectively replacing a first bytecode for the at least one method of a first class of the plurality of classes of the managed runtime application with proxy code based on the method invocation statistics, wherein the proxy code is configured for retrieving the first bytecode.

13. The computer system of claim 12, further comprising:
response to determining that the at least one method is not invoked during execution of the managed runtime application based on the method invocation statistics, program instructions to replace the first bytecode for the at least one method of the first class of the managed runtime application with the proxy code.

14. The computer system of claim 13, wherein the first bytecode for the at least one method of the first class of the managed runtime application is selectively replaced with the proxy code further based on a size of the first bytecode.

15. The computer system of claim 12, further comprising:
program instructions to generate an identifier for a location of the first bytecode in a data storage;
program instructions to generate the proxy code for retrieving the first bytecode from the location in the data storage, and
program instructions to store the first bytecode at the location in the data storage.

16. The computer system of claim 12, wherein the program instructions to generate the optimized version of the managed runtime application further comprises:
responsive to determining that the first class is not invoked during execution of the managed runtime application based on the method invocation statistics, program instructions to selectively remove the first class of the managed runtime application; and
program instructions to update a custom class loader associated with the managed runtime application with an identifier of the first class.

17. The computer system of claim 12, further comprising:
program instructions to receive invocation statistics for the optimized version, wherein:
the invocation statistics are selected from the group consisting of identifying at least one invocation of the proxy code and identifying at least one invocation of the first class,
the first class was present in the managed runtime application but is not present in the optimized version, and
the invocation statistics are obtained during at least one previous execution of the optimized version; and
program instructions to generate an updated version of the optimized version based on the invocation statistics.

18. The computer system of claim 17, wherein the program instructions to generate the updated version comprise:
program instructions to compare a number of invocations of the proxy code or the first class with a corresponding predefined threshold; and
responsive to the number of invocations of the proxy code or the first class being greater than or equal to the predefined threshold, program instructions to retrieve the first bytecode associated with the proxy code or the first class and replace the proxy code or the first class in the optimized version with the first bytecode.

19. The computer system of claim 12, further comprising:
program instructions to receive a request to run the managed runtime application;
program instructions to execute the managed runtime application with a profiling agent, wherein the profiling agent records the one or more methods invoked during execution of the managed runtime application, and
responsive to an indication that the execution of the managed runtime application is complete, program instructions to store the one or more methods recorded by the profiling agent as method invocation statistics for use in generating the optimized version of the managed runtime application.

20. A computer program product comprising:
one or more computer-readable storage media and program instructions stored on the one or more computer-readable storage media, the program instructions comprising:
program instructions to receive method invocation statistics for a managed runtime application, wherein:
the managed runtime application comprises code,
the code comprises a plurality of classes,
each class of the plurality of classes includes a corresponding bytecode for one or more methods associated with each class,
the method invocation statistics identify at least one method of the one or more methods invoked during at least one previous execution of the managed runtime application; and
program instructions to generate an optimized version of the managed runtime application based on the method invocation statistics by:
retrieving the managed runtime application, and
selectively replacing a first bytecode for the at least one method of a first class of the plurality of classes of the managed runtime application with proxy code based on the method invocation statistics, wherein the proxy code is configured for retrieving the first bytecode.

* * * * *